(12) United States Patent
Al-Omari et al.

(10) Patent No.: US 11,514,070 B2
(45) Date of Patent: Nov. 29, 2022

(54) SEAMLESS INTEGRATION BETWEEN OBJECT-BASED ENVIRONMENTS AND DATABASE ENVIRONMENTS

(71) Applicants: Awny Al-Omari, Cedar Park, TX (US); Louis Benton Landry, Dayton, OH (US); Stephen Andrew Brobst, Las Vegas, NV (US); Donald Raymond Pederson, San Diego, CA (US); Todd Walter, Mississauga (CA); Oliver Ratzesberger, Mississauga (CA)

(72) Inventors: Awny Al-Omari, Cedar Park, TX (US); Louis Benton Landry, Dayton, OH (US); Stephen Andrew Brobst, Las Vegas, NV (US); Donald Raymond Pederson, San Diego, CA (US); Todd Walter, Mississauga (CA); Oliver Ratzesberger, Mississauga (CA)

(73) Assignee: Teradata US, Inc., San Diego, CA (US)

(*) Notice: Subject to any disclaimer, the term of this patent is extended or adjusted under 35 U.S.C. 154(b) by 118 days.

(21) Appl. No.: 16/235,819

(22) Filed: Dec. 28, 2018

(65) Prior Publication Data

US 2020/0110757 A1    Apr. 9, 2020

Related U.S. Application Data

(60) Provisional application No. 62/742,351, filed on Oct. 6, 2018.

(51) Int. Cl.
*G06F 16/00* (2019.01)
*G06F 16/25* (2019.01)
*G06F 9/54* (2006.01)
*G06F 16/9038* (2019.01)
*G06F 16/23* (2019.01)

(52) U.S. Cl.
CPC .............. *G06F 16/258* (2019.01); *G06F 9/54* (2013.01); *G06F 16/2393* (2019.01); *G06F 16/9038* (2019.01)

(58) Field of Classification Search
CPC .............. G06F 16/2393; G06F 16/258; G06F 16/9038; G06F 16/972
USPC .......................................................... 707/756
See application file for complete search history.

(56) References Cited

U.S. PATENT DOCUMENTS

| | | | | |
|---|---|---|---|---|
| 5,418,943 | A * | 5/1995 | Borgida | G06F 16/24564 |
| | | | | 707/999.004 |
| 6,295,531 | B1 * | 9/2001 | Bae | G06F 16/972 |
| 7,437,377 | B1 * | 10/2008 | Turba | G06F 16/972 |
| 7,548,906 | B2 * | 6/2009 | Morris | G06F 16/3325 |
| 2001/0047372 | A1 * | 11/2001 | Gorelik | G06F 16/288 |
| | | | | 715/239 |

(Continued)

*Primary Examiner* — Vincent F Boccio
(74) *Attorney, Agent, or Firm* — Gates & Cooper LLP (57) ABSTRACT

An Application Programming Interface (API) processes object storage requests in an object storage format that are received from client applications. A mapper maps the object storage formatted requests into database statements and executes the statements within a database management system. Results returned from the statements are mapped by the mapper to object-storage constructs and provided to the API in object storage format. The object storage formatted requests are provided from the API to the client applications to satisfy the original client applications' requests.

19 Claims, 4 Drawing Sheets

(56) References Cited

U.S. PATENT DOCUMENTS

| | | | |
|---|---|---|---|
| 2003/0055835 A1* | 3/2003 | Roth | G16B 50/00 |
| 2005/0216497 A1* | 9/2005 | Kruse | G06Q 10/00 |
| 2007/0299842 A1* | 12/2007 | Morris | G06F 16/355 |
| 2013/0332862 A1* | 12/2013 | Mirra | G06F 3/04842 715/760 |

* cited by examiner

SEAMLESS INTEGRATION BETWEEN OBJECT-BASED ENVIRONMENTS AND DATABASE ENVIRONMENTS

RELATED APPLICATIONS

The present application is a non-provisional application of and claims priority to U.S. Provisional Application Ser. No. 62/742,351 filed Oct. 6, 2018, entitled: "Virtual S3 Store over SQL Database and Computed Datasets;" the disclosure of which is hereby incorporated by reference in its entirety.

BACKGROUND

In object storage environments it is common to disconnect the compute and interface environment from external storage architectures that house the source data. The interface and computing environments have no control over the underlying data structure of the source data and no control over how the source data is provided back to the interface and computing environments. Such arrangements allow for a great deal of user customization in the services that access and consume the source data as needs of the user change, without concern over how the data is stored and without requirements to change how the data is stored.

An example object storage is Amazon® Simple Storage Service® (S3) designed to make web-scale computing easier for developers by allowing any amount of data associated with S3 storage objects to be stored and accessed from anywhere at any time on the web. The S3 objects include a simple key allowing storage and retrieval of the S3 objects from one or more buckets. Amazon® Web Services® (AWS) provides an interface for accessing and managing S3 storage objects from buckets.

Users can perform a lot of customizations and integrations with their data through AWS and S3 objects. However, such services are not as robust as established relational database management systems (DBMS) and do not include many of the data management features available from a DBMS. Any desired data features or data management features have to be custom developed by the user.

Yet with relational databases, users typically have to understand how their data is going to be used so that the data can be optimally structured for storage, access, and management. This advance data knowledge can be time consuming and require expertise, and if the underlying data is not optimally structured performance and many benefits of the relational database can be adversely impacted.

Therefore, it is desirable to provide the flexibility and customization of object storage environment interfaces while also benefiting from the native data features and data management provided with a relational DBMS.

SUMMARY

In various embodiments, methods and a system for seamless integration between object storage environments and database environments are provided.

In one embodiment, a method for seamless integration between object storage environments and database environments is provided. Object storage request with object-storage data constructs is received. The object storage request and the object-storage data constructs is mapped to database statements having database constructs. The database statements with the database constructs are processed on a database system.

DETAILED DESCRIPTION

Figure 1:
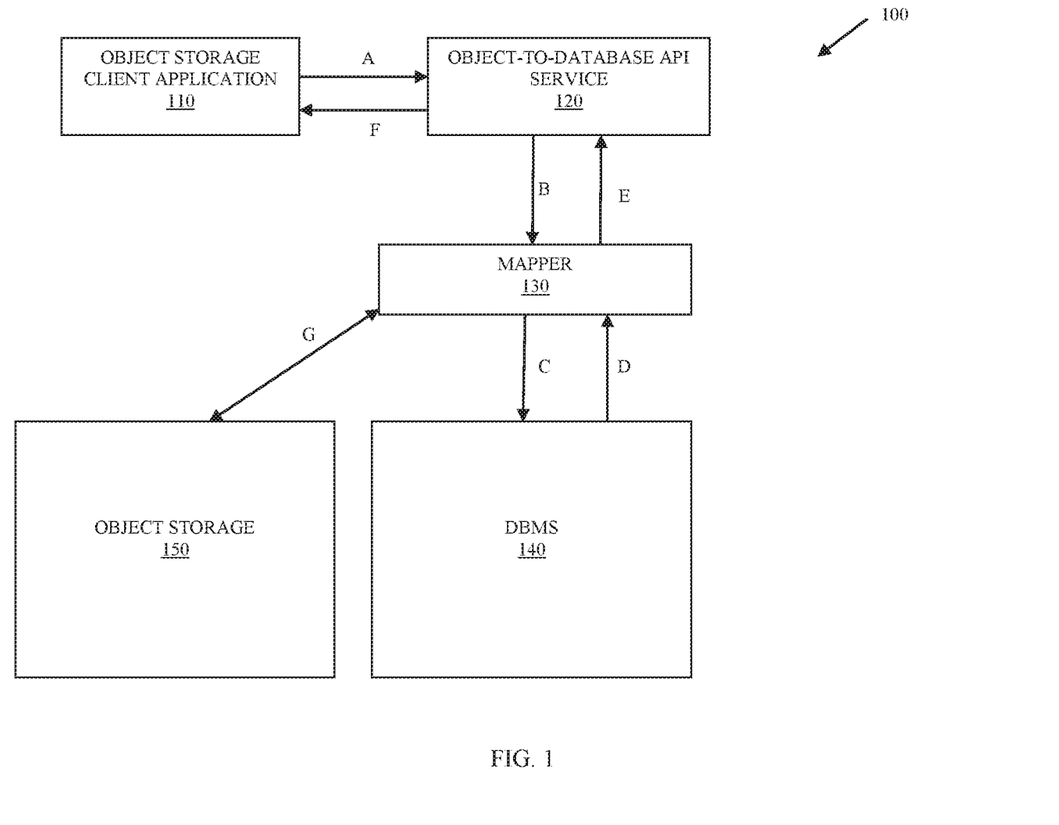
FIG. 1 is a diagram of a system for seamless integration between object storage environments and database environments, according to an embodiment.

FIG. 1 is a diagram of a system 100 for seamless integration between object storage environments and database environments, according to an embodiment. The system 100 is shown in greatly simplified form with just those components necessary for understanding the teachings of seamless integration between object storage environments and database environments being illustrated. It is to be noted that a variety of other components or less components can be employed without departing for the teachings of seamless integration between object storage environments and database environments presented herein and below.

The system 100 includes: a plurality of object storage client applications 110, a plurality of object-to-database Application Programming Interface (API) services 120, a mapper 130, a DBMS 140, and one or more object storages 150.

The processing/computing environment if the DBMS environment 140 is completely separate and independent of object storage environments 150.

In an embodiment, the DBMS 140 is relational and operates on Structured Query Language (SQL) formatted requests.

In an embodiment, the DBMS 140 is non-relational and operates on non-formatted SQL requests.

The components 110-150 are implemented as executable instructions that reside in a non-transitory computer-readable storage medium and are executed by one or more hardware processors of devices associated with the DBMS 140 and some not associated with the DBMS 140. It is to be noted that each component may comprise multiple sub-components logically cooperating to form and perform the processing of the noted component.

As used herein, the terms and phrases "database," "database management system (DBMS)," and "data warehouse" may be used interchangeably and synonymously. That is, a data warehouse may be viewed as a collection of databases or a collection of data from diverse and different data sources that provides a centralized access and federated view of the data from the different data sources through the data warehouse (may be referred to as just "warehouse"). The DBMS 140 includes a variety of database tools and operations to manage and provide database services.

In an embodiment, the object storage client application 110 is an S3 application written by a user for accessing S3 storage objects utilizing AWS. However, it is noted that any object-based client application interface can be used without departing from the seamless integration between object storage environments and database environments discussed herein.

The object storage client application 110 provides references to storage objects being created, modified, combined, deleted, and/or retrieved from buckets. These references provided through the interface 100 may be referred to herein as "client-issued storage object requests."

The client-issued storage object statements A are sent to an object-to-database API service 120 through the interface 110.

In an embodiment, the API service 120 is a Representational State Transfer-enabled API (RESTful API).

In an embodiment, the API service 120 can execute as multiple independent instances of itself, each instance designed to service a particular client application 110. Furthermore, multiple parallel executing instances of the API service 120 can be deployed for performing large requests on large datasets, such as for data loading, query processing, etc.

The storage object requests A are sent by the API service 120 to the mapper 130 over B. The mapper 130 is responsible for mapping the storage object statements and structures (buckets, storage object identifiers, etc.) into DBMS recognized statements and structures (tables, columns, rows, partitions, views, materialized views, etc.).

Once the mapper 130 has transformed the storage-object formatted initial request B into DBMS recognized statements and structures, the mapper 130 provides the request in the translated statements and structures to the DBMS 140 over C.

The DBMS 140 may include a variety of sub components to optimally process the translated statements, such as a parser, an optimizer (that may rewrite the statements into more efficient equivalent statements, and database engines, which may cooperate to execute portions of the statements in parallel and produce results for the statements. In fact, all the beneficial aspects of data access and data manipulation optimizations capable in the DBMS 140 can be realized when the statements for the request C are executed by the various components of the DBMS 140.

The results of executing the statement are provided back from the DBMS 140 as database-formatted data over D to the mapper 130. The mapper 140 then maps the database-formatted results back to the storage-object environment format and provides to the API service 120 over E.

Finally, the storage-object environment formatted results are provided over F back to the original requesting client application 110.

In an embodiment, the original client-issued request, at A, may include data operations associated with data that is natively stored in an object storage 150. In such cases, the mapper 130 is configured to obtain such storage objects and their data values from the object storage 150 over G. That storage object-formatted data can then be transformed into a relational table using Structured Query Language (SQL) SELECT statements by the mapper 130 and integrated in the relational DBMS-formatted statements for execution by the DBMS 140. In this way, the initial request, A, can include a hybrid where data to satisfy the request is natively housed and projected in database structures of the DBMS 140 and other data needed to satisfy the request is natively stored within the object storage 150. This provides integration between data housed in relational database projections (transformed relational database structures) and data housed natively in the object storage 150. Furthermore, once the storage object data values are obtained and casted into an equivalent relational database structure, the corresponding equivalent relational database structure may be used as a cache for the object storage data within the DBMS 140 during request processing.

In an embodiment, an API service manager can perform load balancing between multiple requests, A, being received from multiple client applications 110 between multiple instances of the API service 120. The number of needed instances of the API service 120 can be scaled up or scaled down as needed by the API service manager.

In an embodiment, an API storage manager is responsible for managing storage needed in staging areas by the executing instances of the API service 120.

The metadata associated with the mappings needed to map the storage-object interface structures to database structures is persistent metadata maintained by the mapper 130. In an embodiment, an external database is used to maintain the metadata mappings.

In an embodiment, the mapper 130 identifies an S3 bucket in the request (A and B in the FIG. 1) as a virtual bucket that includes a collection of datasets in the DBMS 140. This collection can be an entire database, a database schema, a predefined set of datasets, or a single dataset. In addition, the mapper 130 maintains with the object's default data format as noted in the request (A and B) by the client application 110.

In an embodiment, the mapper 130 identifies an S3 object in the request (A and B in the FIG. 1) as a virtual object that is reference a subset of a dataset included in the DBMS 140; the dataset is a member of a collection of datasets referenced in the virtual bucket. The virtual object can reference a table, view, or a subset of a table or a view. So, the virtual object references a collection of rows that belong to a same table or view. Moreover, a table or view can be represented by a single virtual object or a union of multiple virtual objects.

Once the mapper 130 has defined SQL statements for defining the virtual buckets and their virtual objects in the database format and executed by the DBMS 140, the client application 110 can issue any object-storage formatted bucket and storage object request as if such requests were being sent directly to the object storage 150, and the requests can be serviced through the DBMS 140. So, the mapper 130 obtains the metadata mappings for any given request issued from the client application 110 in the storage-object format, and issues statements as queries to the DBMS to return the appropriate mapped buckets and storage objects as the virtual buckets having the virtual storage objects (as tables, views, materialized views, etc.). The individual requests can then be satisfied from the returned tables, views, materialized views, etc. by SQL operations mapped in the requests.

U.S. Provisional Application No. 62/742,351, which was incorporated by reference herein in its entirety, provided specific examples as to how a storage object environment request A is transformed and mapped to DBMS 140 statements and executed by the DBMS 140.

It is to be noted, that any native format of the data within the DBMS 140 does not have to be changed and does not have to be stored in multiple tables natively; rather, the metadata mappings provide the mechanism by which the mapper 130 can produce metadata statements to create and manipulate the native data from generated tables, viewed, and materialized views dynamically and as needed based on the requests.

The system 100 allows for seamless integration of object storage environments and their interfaces with a DBMS environment. All DBMS 140 optimizing, parallel processing, indexing, and clustering operations are available on the client's data that is being projected from a storage object format into a database format through the metadata mappings maintained by the mapper 130.

The system 100 also provides a RESTful API service 120 for client application 110 interaction, such that the client applications associated with the applications 110 do not have to be concerned with compatibility and/or certification before a new client application 100 is provided or when changes are made to versions in the underlying DBMS 140.

The user can uses their object-storage client applications 110 to access object storages 150. The applications 110 can be used to access any S3 object storage without modification. Furthermore, the client applications 110 can have requests A that access a portion of the user's data from the native object storage 150 with another portion of the user's data projected in the DBMS 140 (hybrid approach).

The system 100 also allows for integration of a large number of existing client application 110 to utilize the API service 120 for purposes of obtaining the data management, optimization, indexing, and other features on their object storage 150 data within the DBMS 140.

These and other embodiments are now discussed with reference to the FIGS. 2-4.

Figure 2:
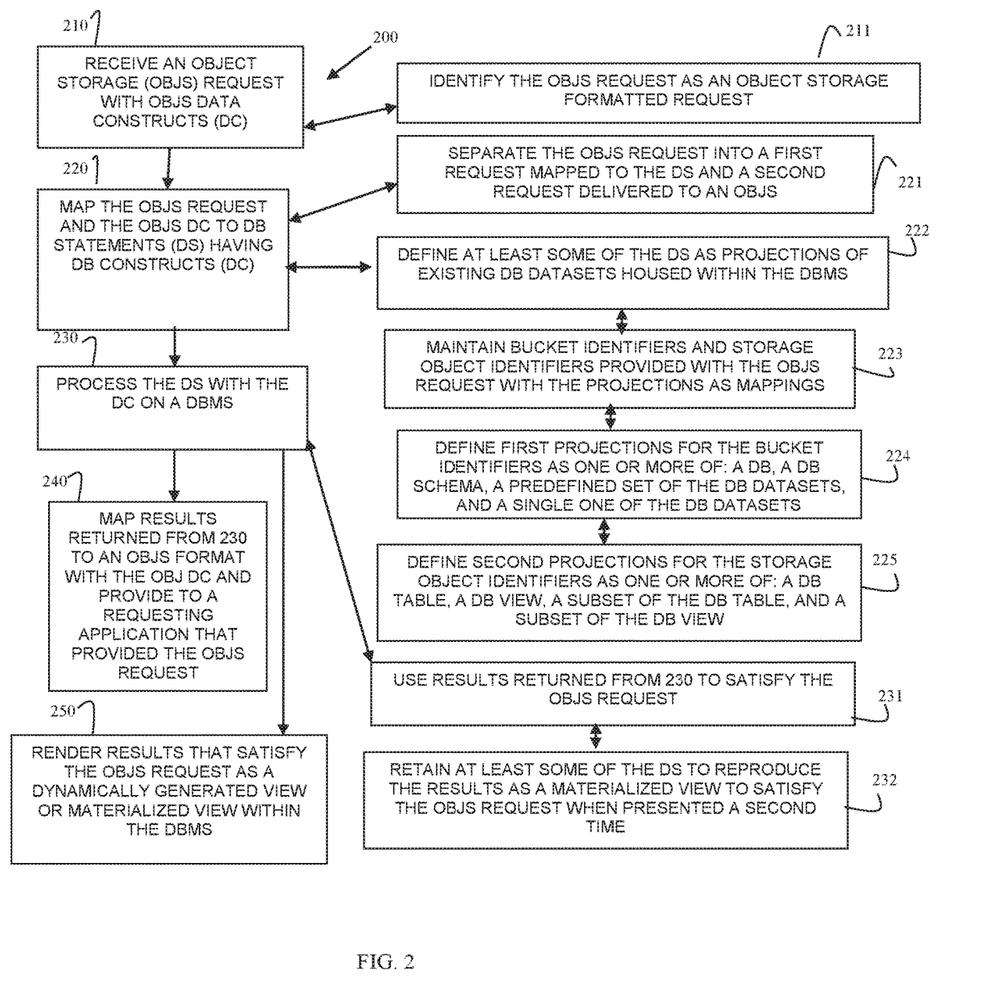
FIG. 2 is a diagram of a method for seamless integration between object storage environments and database environments, according to an example embodiment.

FIG. 2 is a diagram of a method 200 for seamless integration between object storage environments and database environments, according to an example embodiment. The method 200 is implemented as one or more software modules referred to as an "object-storage data mapper"). The object-storage data mapper represents executable instructions that are programmed within memory or a non-transitory computer-readable medium and executed by one or more hardware processors of one or more devices. The object-storage data mapper may have access to one or more network connections during processing, which can be wired, wireless, or a combination of wired and wireless.

In an embodiment, the object-storage data mapper executes on devices of a data warehouse across one or more physical devices or nodes (computing devices) for execution over one or more network connections.

In an embodiment, the object-storage data mapper executes on devices comprising a cloud computing environment.

In an embodiment, the object-storage data mapper is all or of or any combination of: object-database API service 120, the mapper 130, and/or the DBMS 140.

At 210, the object-storage data mapper receives an object storage request with object storage data constructs.

In an embodiment, at 211, the object-storage data mapper identifies the object storage request as an object storage formatted requests provided from a client application using object storage interface commands and syntax.

At 220, the object-storage data mapper maps the object storage request and the object storage data constructs to database statements having database constructs.

In an embodiment, at 221, the object-storage data mapper separates the object storage requests into a first request mapped to the database statements and a second request delivered to an external object storage. This is a hybrid approach discussed above with the FIG. 1 where a portion of the request is satisfied based on database data and another portion of the request is satisfied with non-database object storage data. The object storage data can be transformed and maintained as database data in a database construct as a form of cache to the native object storage.

In an embodiment, at 222, the object-storage data mapper defines at least some of the database statements as projections of existing database datasets housed within the database.

In an embodiment of 222 and at 223, the object-storage data mapper maintains bucket identifiers and storage object identifiers provided with the object storage request with the projections as mappings.

In an embodiment of 223 and at 224, the object-storage data mapper defines first projections for the bucket identifiers as one or more of: a database, a database schema, a predefined set of the database datasets, and a single one of the database datasets.

In an embodiment of 224 and at 225, the object-storage data mapper defines second projections for the storage object identifiers as one or more of: a database table, a database view, a subset of the database table, and a subset of the database view.

At 230, the object-storage data mapper processes the database statements within the database constructs on a DBMS.

In an embodiment, at 231, the object-storage data mapper uses results returned from 230 to satisfy the object storage request received at 210.

In an embodiment of 231 and at 232, the object-storage data mapper retains at least some of the database statements to reproduce results as a materialized view to satisfy the object storage request when presented a second time.

In an embodiment, at 240, the object-storage data mapper maps results returned from 230 to an object storage format with the object storage constructs and provides to a requesting application that provided the object storage request at 210.

In an embodiment, at 250, the object-storage data mapper renders results that satisfy the object storage request as a dynamically generated view or materialized view within the DBMS.

Figure 3:
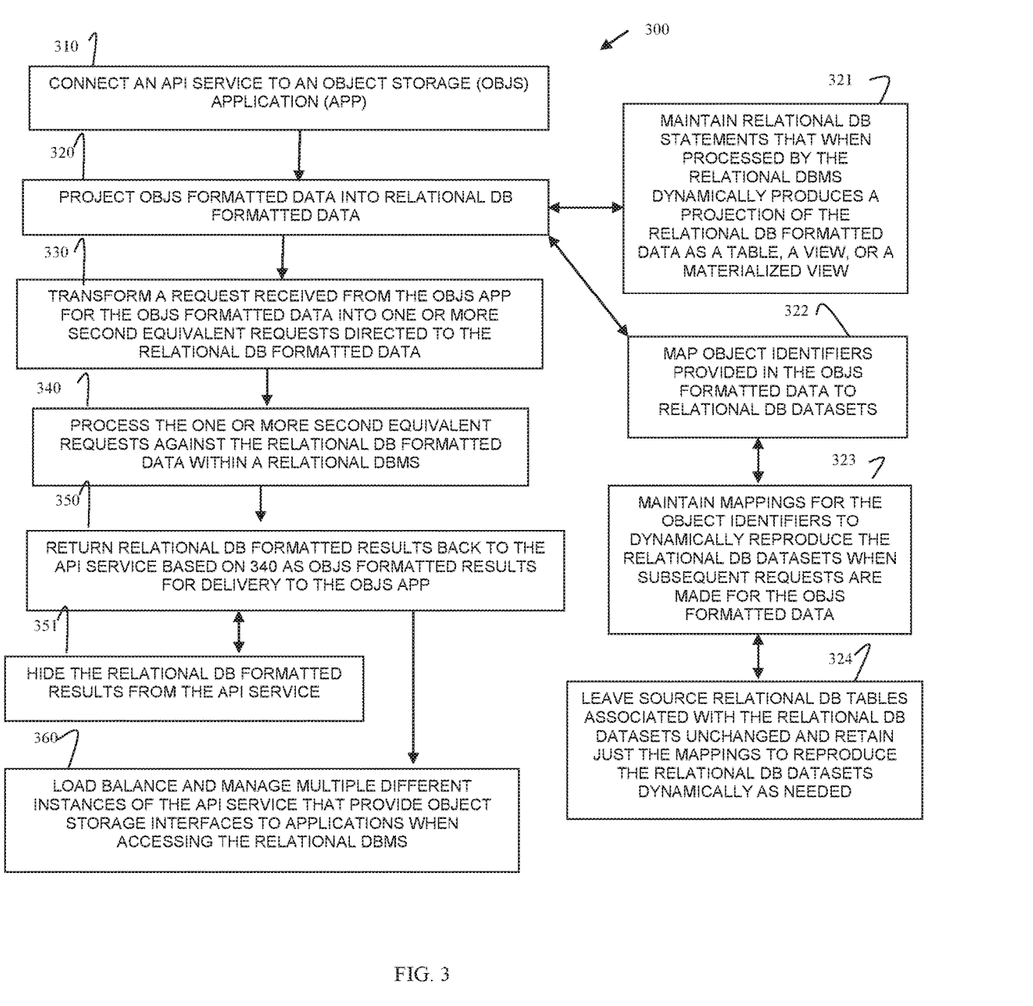
FIG. 3 is a diagram of another method for seamless integration between object storage environments and database environments, according to an example embodiment.

FIG. 3 is a diagram of another method 300 for seamless integration between object storage environments and relational database environments, according to an embodiment. The method 300 is implemented as one or more software modules referred to as an "object storage to relational storage integration service." The object storage to relational storage integration service represents executable instructions that are programmed within memory or a non-transitory computer-readable medium and executed by one or more hardware processors of a device. The object storage to relational storage integration service may have access to one or more network connections during processing, which can be wired, wireless, or a combination of wired and wireless.

The processing depicted for the object storage to relational storage integration service in the FIG. 3 presents another and, in some ways, enhanced perspective of the processing discussed above with the FIGS. 1 and 2.

In an embodiment, the object storage to relational storage integration service is all of or any combination of: the object-to-relational API service 120, the mapper, and the relational DBMS 140, and/or the method 200.

At 310, the object storage to relational storage integration service connects an API service to an object storage application. In an embodiment, the API service is the API service 120 and the object storage application is the application 110.

At 320, the object storage to relational storage integration service projects object storage formatted data into relational database formatted data.

In an embodiment, at 321, the object storage to relational storage integration service maintains relational database statements that when processed by the relational DBMS dynamically produces a projection of the relational database formatted data as a table, a view, or a materialized view.

In an embodiment, at 322, the object storage to relational storage integration service maps object identifiers provided in the object storage formatted data to relational database datasets.

In an embodiment of 322 and at 323, the object storage to relational storage integration service maintains mappings for the object identifiers to dynamically reproduce the relational database datasets when subsequent requests are made for the object storage formatted data.

In an embodiment of 323 and at 324, the object storage to relational storage integration service leaves source relational database tables associated with the relational database datasets unchanged and retains just the mappings to reproduce the relational database datasets dynamically as needed.

At 330, the object storage to relational storage integration service transforms a request received from the object storage application for the object storage formatted data into one or more second equivalent requests directed to the relational database formatted data.

At 340, the object storage to relational storage integration service processes the one or more second equivalent requests against the relational database formatted data within a relational DBMS.

At 350, the object storage to relational storage integration service returns relational database formatted results back to the API service based on 340 as object storage formatted results for delivery by the API service to the object storage application.

In an embodiment, at 351, the object storage to relational storage integration service hides the relational database formatted results from the API service. That is, the API service does not know how to process and does not recognize the relational database formatted results.

In an embodiment, at 360, the object storage to relational storage integration service load balances and manages multiple different executing instances of the API service. The instances of the API service provide object storage interfaces to object storage-based applications when accessing the relational DBMS.

Figure 4:
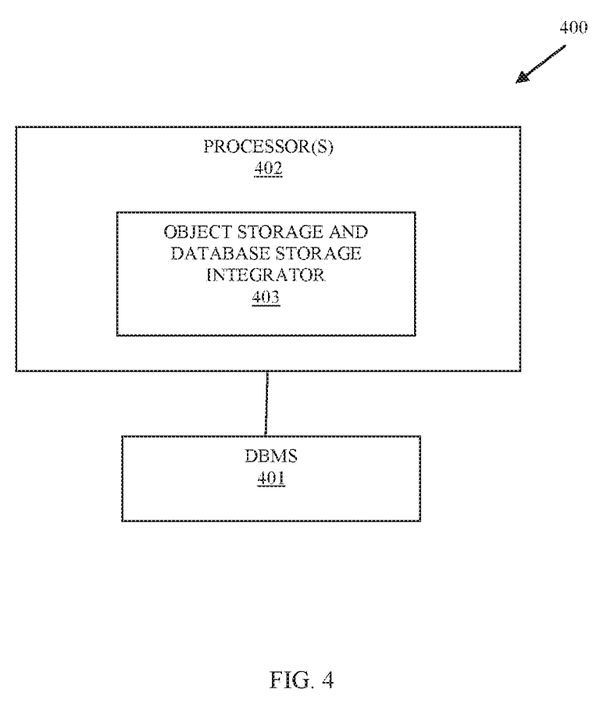
FIG. 4 is a diagram of a system for seamless integration between object storage environments and database environments, according to an example embodiment.

FIG. 4 is a diagram of a system 400 for seamless integration between object storage environments and database environments, according to an example embodiment. The system 400 includes a variety of hardware components and software components. The software components are programmed as executable instructions into memory and/or a non-transitory computer-readable medium for execution on the hardware components (hardware processors). The system 400 includes one or more network connections; the networks can be wired, wireless, or a combination of wired and wireless.

The system 400 implements, inter, the processing discussed above with the FIGS. 1-3.

The system 400 includes; a DBMS 401, at least one hardware processor 402 and a non-transitory computer-readable storage medium having executable instructions representing an object storage and database storage integrator 403.

The object storage and database storage integrator 403 when executed on the at least one hardware processor 402 from the non-transitory computer-readable storage medium performs processing to: project object storage formatted data into database formatted data; transform object formatted requests into database statements against the database formatted data; process the database statements against the database formatted data using the database management system 401; and provide results from the requests back to requesting client applications as object storage formatted results.

In an embodiment, the object storage and database storage integrator 403 is further configured to perform processing to maintain mappings between storage object constructs to dynamically generate equivalent database constructs within the database management system 401.

In an embodiment, the object storage and database storage integrator 403 is further configured to perform processing to.

In an embodiment, the object storage and database storage integrator 403 is all or some combination of: the object-to-database API service 120, the mapper 130, the method 200, and/or the method 300.

In an embodiment, the DBMS 401 is DBMS 140.

In an embodiment, the DBMS 401 is a relational DBMS.

In an embodiment, the DBMS 401 is a non-relational DBMS.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method, comprising:
receiving an object storage request from a requesting application with object storage data constructs for an object storage;
mapping the object storage request with the object storage data constructs to database statements with database constructs for a database management system (DBMS), wherein the mapping translates the object storage request into the database statements that identify a bucket in the object storage request as a virtual bucket that includes a collection of one or more datasets in the DBMS comprising one or more tables and views, and that identify an object in the object storage request as a virtual object of the virtual bucket that references a subset of the datasets in the DBMS comprising one or more rows that belong to the tables and views;
processing the database statements with the database constructs on the DBMS to generate database formatted results;
mapping the database formatted results returned from the processing to results in an object storage format with the object storage data constructs to return the bucket and object for the object storage request as the virtual bucket and the virtual object; and
providing the results in the object storage format with the object storage data constructs to the requesting application that provided the object storage request.

2. The method of claim 1, further comprising rendering results that satisfy the object storage request as a dynamically generated database view or a materialized view within the DBMS.

3. The method of claim 1, wherein the receiving further includes identifying the object storage request as an object storage formatted request.

4. The method of claim 1, wherein the mapping further includes separating the object storage request into a first request mapped to the database statements and a second request delivered to the object storage.

5. The method of claim 1, wherein the mapping further includes defining at least some of the database statements as projections of existing database datasets.

6. The method of claim 5, wherein the defining further includes maintaining bucket identifiers and storage object identifiers provided with the object storage requests with the projections as mappings.

7. The method of claim 6, wherein the maintaining further includes defining first projections for the bucket identifiers as one or more of: a database, a database schema, a predefined set of the datasets, and a single one of the datasets.

8. The method of claim 7, wherein the defining further includes defining second projections for the storage object identifiers as one or more of: the tables, the views, a subset of the tables, and a subset of the views.

9. The method of claim 1, wherein the processing further includes using results returned from the processing to satisfy the object storage request.

10. The method of claim 9, wherein the using further includes retaining at least some of the database statements to reproduce the results as a materialized view to satisfy the object storage request when presented a second time.

11. A method comprising:
connecting an Application Programming Interface (API) service to an object storage application;
projecting object storage formatted data into relational database formatted data;
transforming an object storage request received from the object storage application for the object storage formatted data into one or more second equivalent database statements directed to the relational database formatted data, wherein the transforming comprises mapping the object storage formatted data to the relational database formatted data, the mapping translates the object storage request into the database statements that identify a bucket in the object storage request as a virtual bucket that includes a collection of one or more datasets in a relational database management system (DBMS) comprising one or more tables and views, and that identify an object in the object storage request as a virtual object that references a subset of the datasets included in the relational DBMS comprising one or more rows that belong to the tables and views;
processing the one or more second equivalent requests against the relational database formatted data within the relational DBMS to generate relational database formatted results; and
returning the virtual bucket having the virtual object in the relational database formatted results back to the API service based on the processing as the bucket and the object in object storage formatted results for delivery to the object storage application.

12. The method of claim 11, wherein the projecting further includes maintaining relational database statements that when processed by the relational DBMS dynamically produces a projection of the relational database formatted data as one of more of the tables, the views, or a materialized view.

13. The method of claim 11, wherein the projecting further includes mapping object identifiers provided in the object storage formatted data to the datasets.

14. The method of claim 13, wherein the mapping further includes maintaining mappings for the object identifiers to reproduce the datasets when subsequent requests are made for the object storage formatted data.

15. The method of claim 14, wherein the maintaining further includes leaving source tables associated with the datasets unchanged and retaining just the mappings to reproduce the datasets dynamically as needed.

16. The method of claim 11, wherein the returning further includes hiding the relational database formatted results from the API service.

17. The method of claim 11, further comprising load balancing and managing multiple different instances of the API service that provide object storage interfaces to applications when accessing the relational DBMS.

18. A system, comprising:
a database management system;
at least one hardware processor;
a non-transitory computer-readable storage medium having executable instructions representing an object storage and database storage integrator;
the object storage and database storage integrator configured to execute on the at least one hardware processor from the non-transitory computer-readable storage medium and to perform processing to:
project object storage formatted data into database formatted data;
transform object storage requests into database statements against the database formatted data, wherein the transform maps the object storage formatted data to the database formatted data, the map translates the object storage request into the database statements that identify a bucket in the object storage requests as a virtual bucket that includes a collection of one or more datasets in the database management system comprising one or more tables and views, and that identify an object in the object storage requests as a virtual object that references a subset of the datasets in the database management system comprising one or more rows that belong to the tables and views;
process the database statements against the database formatted data using the database management system to generate database formatted results; and
provide the database formatted results comprising the virtual bucket and the virtual object from the database statements back to requesting client applications as object storage formatted results comprising the bucket and the object.

19. The system of claim 18, wherein the object storage and database storage integrator is further configured to perform processing to: maintain mappings between storage object constructs to dynamically generate equivalent database constructs within the database management system.

* * * * *